(12) United States Patent
Alameh et al.

(10) Patent No.: US 11,343,372 B2
(45) Date of Patent: May 24, 2022

(54) SHIELDING A CAPACITANCE SENSOR DURING EAR-SPEAKER MODE OF A MOBILE DEVICE

(71) Applicant: MOTOROLA MOBILITY LLC, Chicago, IL (US)

(72) Inventors: Rachid Alameh, Crystal Lake, IL (US); Eric L. Krenz, Crystal Lake, IL (US); Matthew R. Klocek, Downers Grove, IL (US); John J. Gorsica, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 32 days.

(21) Appl. No.: 16/887,808

(22) Filed: May 29, 2020

(65) Prior Publication Data

US 2021/0377384 A1 Dec. 2, 2021

(51) Int. Cl.
*H04M 1/72454* (2021.01)
*G01D 5/24* (2006.01)
*G06F 3/044* (2006.01)

(52) U.S. Cl.
CPC .......... *H04M 1/72454* (2021.01); *G01D 5/24* (2013.01); *G06F 3/044* (2013.01); *G06F 2203/04107* (2013.01); *G06F 2203/04108* (2013.01)

(58) Field of Classification Search
CPC ................ H04M 1/72454; G06F 3/044; G06F 2203/04108; G06F 2203/04107; G01D 5/24
See application file for complete search history.

(56) References Cited

U.S. PATENT DOCUMENTS

| 9,300,645 | B1* | 3/2016 | Rao | G06F 3/017 |
| 9,300,781 | B1* | 3/2016 | Liao | H04M 1/60 |
| 2014/0070080 | A1* | 3/2014 | Ruh | G01S 7/4813 |
| | | | | 250/216 |
| 2014/0158889 | A1* | 6/2014 | Ruh | G01S 17/04 |
| | | | | 250/353 |
| 2014/0218340 | A1* | 8/2014 | Rai | G01S 17/04 |
| | | | | 345/175 |
| 2014/0252209 | A1* | 9/2014 | Land | G01J 1/4204 |
| | | | | 250/208.2 |
| 2017/0003379 | A1* | 1/2017 | Downing | G01S 17/36 |
| 2017/0251097 | A1* | 8/2017 | Jackson | H04M 1/72454 |
| 2021/0208831 | A1* | 7/2021 | Zhang | G06F 1/1694 |

* cited by examiner

*Primary Examiner* — David D Davis
(74) *Attorney, Agent, or Firm* — Isidore PLLC

(57) ABSTRACT

A method, a mobile device, and a computer program product enable capacitive proximity sensing in a mobile device. The method includes determining, by a controller of a mobile device, whether the mobile device is participating in an active phone call. In response to determining that the mobile device is participating in an active phone call, the method further includes determining if an ear speaker mode of the mobile device is enabled. In response to determining that the ear speaker mode of the mobile device is enabled, the method further includes activating a driven shield to at least partially shield a capacitance sensor from sensing object capacitance at a second side of the mobile device that is opposed to a first side with the ear speaker.

20 Claims, 12 Drawing Sheets

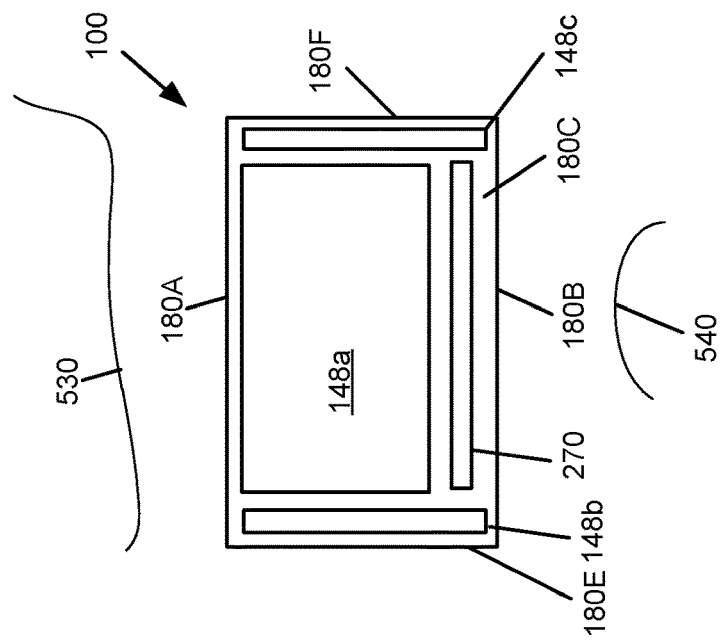
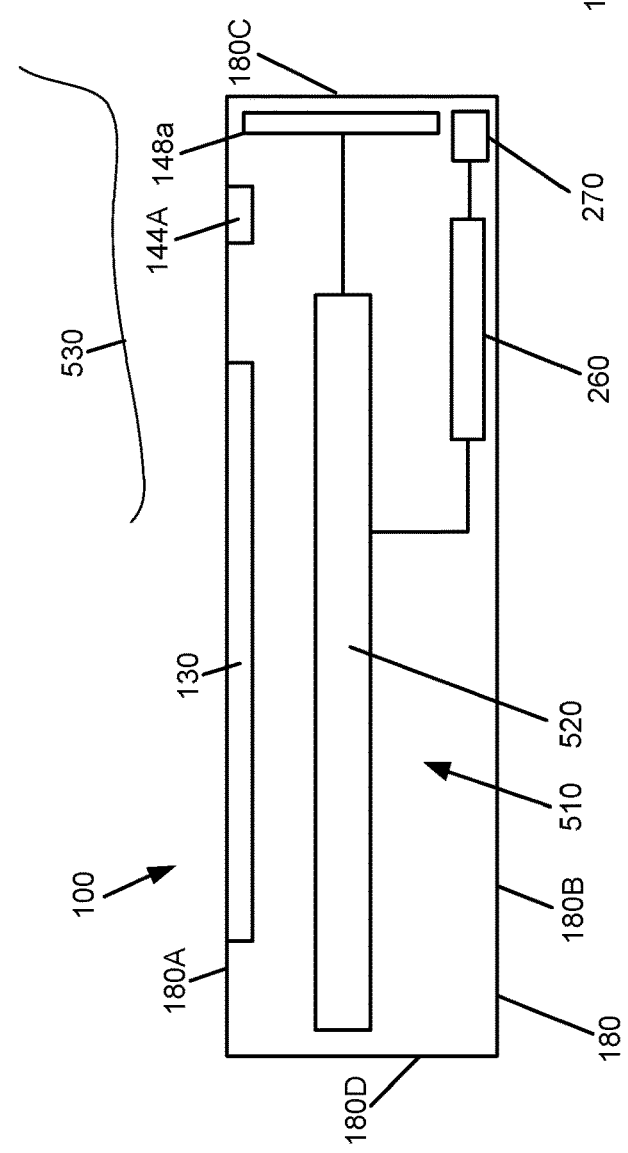
FIG. 5B
FIG. 5A

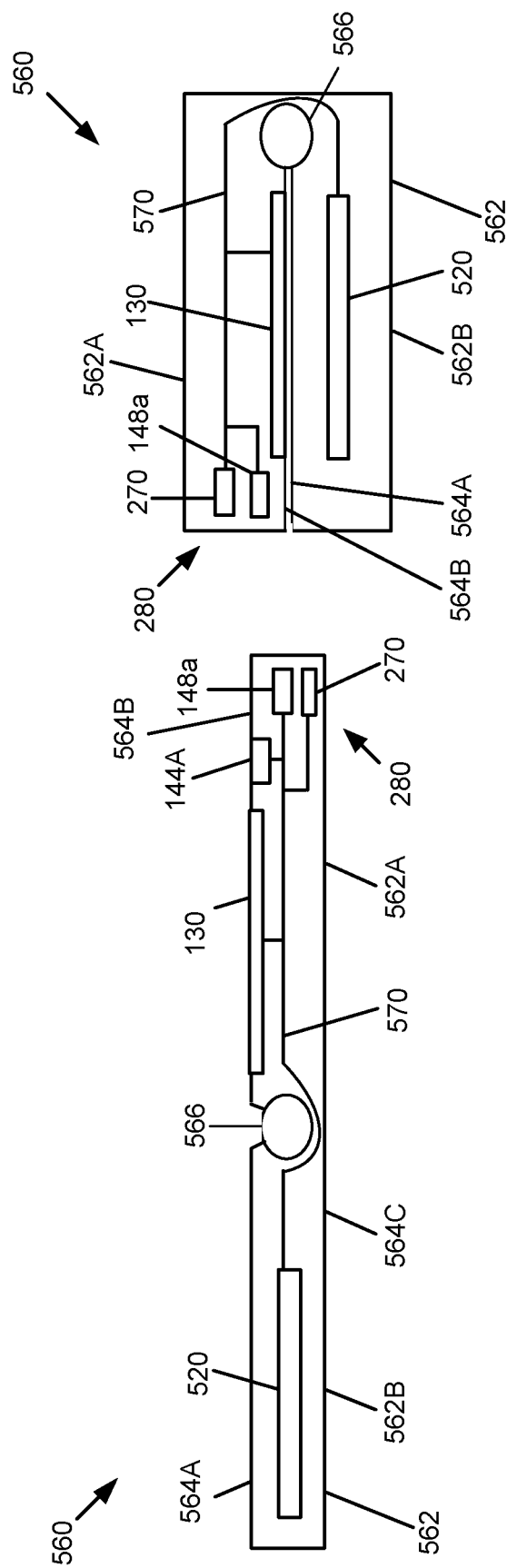

SHIELDING A CAPACITANCE SENSOR DURING EAR-SPEAKER MODE OF A MOBILE DEVICE

BACKGROUND

1. Technical Field

The present disclosure generally relates to mobile devices, and in particular to capacitive proximity sensing in a mobile device.

2. Description of the Related Art

Personal electronic devices, such as cell phones, smartphones and other mobile devices enjoy widespread use in today's society. Smartphones can use liquid crystal displays (LCD) and organic light emitting diode (OLED) displays. OLED displays include an organic compound that emits light when an electrical current is applied. OLED displays can be designed in an edge to edge manner where the size of the OLED display is maximized to take up almost the entire front of the smartphone.

Smartphones frequently also include a proximity sensor. The proximity sensor is a sensor that is capable of detecting the presence of nearby objects, without any physical contact with the object. Proximity sensors generally include an infrared (IR) emitter or a vertical cavity surface emitting laser (VCSEL) and an IR light sensor. As one application, proximity sensors are used in smartphones in support of touchscreen displays. The proximity sensor senses when the smartphone is near the face of a user, such as during a phone call. The proximity sensor can then trigger the disabling of the touchscreen to prevent accidental taps on the touchscreen when against the face. Recent efforts to produce an edge-to-edge display with proximity sensors have placed the IR proximity sensor under the OLED display. Emitted light travels through the display to reach the front of the smartphone. Placing a proximity sensor under the OLED display also causes attenuation and added complexity. The use of proximity sensors under the OLED display also causes a watermark effect when light emitted by the IR emitter or VCSEL impinges on inner layers of the OLED display. These watermarks are visible to the naked eye.

Smartphones today include antennas distributed along the sides and/or edges of the smartphone. These antennas also act as capacitive sensors to detect when the body of a user comes near the antenna to control the level of radio frequency (RF) transmission/reception. These capacitive sensors are designed to detect a body touching the smartphone from both the front and back side of the smartphone.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5A is a side view of a mobile device including a capacitance sensor and a driven shield, according to one or more embodiments;

FIG. 5B is a top view of the mobile device of FIG. 5A including a capacitance sensor and a driven shield, according to one or more embodiments;

FIG. 5C is a side view of a flip-type mobile device in an open position, according to one or more embodiments;

FIG. 5D is a side view of a flip-type mobile device in a closed position, according to one or more embodiments;

DETAILED DESCRIPTION

Figure 1:
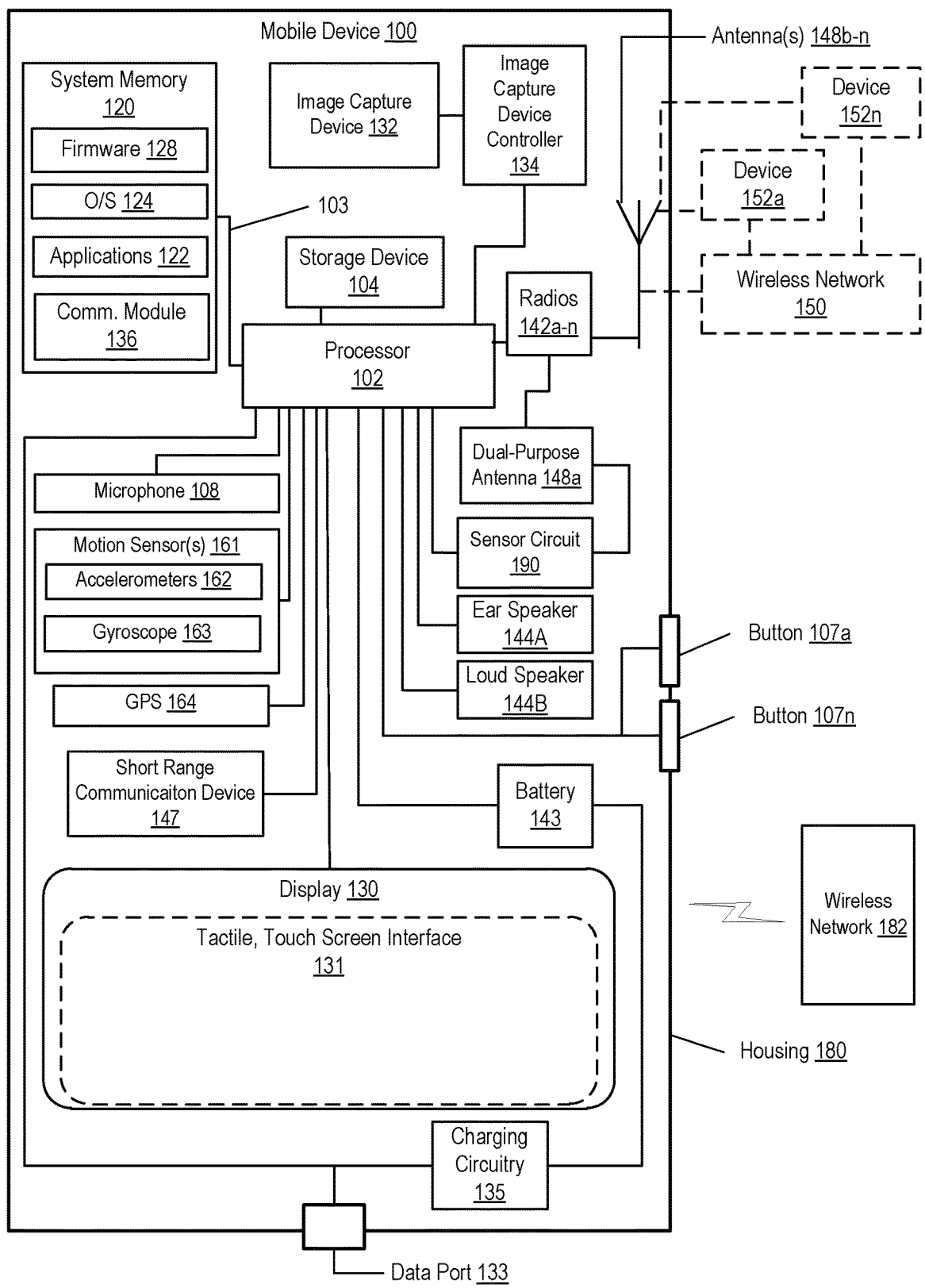
FIG. 1 depicts an example mobile device within which various aspects of the disclosure can be implemented, according to one or more embodiments.

The illustrative embodiments provide a method, a mobile device, and a computer program product for capacitive proximity sensing in a mobile device. The method includes determining, by a controller of a mobile device, whether the mobile device is participating in an active phone call. In response to determining that the mobile device is participating in an active phone call, the method further includes determining if an ear speaker mode of the mobile device is enabled. In response to determining that the ear speaker mode of the mobile device is enabled, the method further includes activating a driven shield to at least partially shield a capacitance sensor from sensing object capacitance at a second side of the mobile device that is opposed to a first side with the ear speaker. The driven shield can also shield the capacitance sensor from sensing object capacitance on a third and/or fourth side of the mobile device with one or more buttons.

According to another embodiment, a mobile device includes an ear speaker, a sensor circuit comprising a capacitance sensor and a driven shield and at least one controller communicatively coupled to the ear speaker, the capacitance sensor, and the driven shield. The at least one controller determines whether the mobile device is participating in an active phone call and in response to determining that the mobile device is participating in an active phone call, determines if an ear speaker mode of the mobile device is enabled. In response to determining that the ear speaker mode of the mobile device is enabled, the controller activates the driven shield to at least partially shield the capacitance sensor from sensing object capacitance at a second side of the mobile device that is opposed to a first side with the ear speaker. The driven shield can also shield the capacitance sensor from sensing object capacitance on a third and/or fourth side of the mobile device with one or more buttons.

According to an additional embodiment, a computer program product includes a computer readable storage device and program code on the computer readable storage device. When executed by a processor associated with a mobile device, the program code enables the device to provide the various functionality presented in the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device (100, FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts example mobile device 100 within which various aspects of the disclosure can be implemented, according to one or more embodiments. Examples of such mobile devices include, but are not limited to, a laptop computer, a notebook computer, a mobile phone, a digital camera, a tablet computer/device, and a smart-watch. The described features of the disclosure are also applicable to other devices with edge-to-edge screens or organic light emitting diode (OLED) displays, including but not limited to computer monitors and televisions. Thus, while the described embodiments refer specifically to mobile devices, it is appreciated that the references to mobile device is for example only and that the described features and functionalities apply equally to the other electronic devices, which are not classified as mobile devices.

Mobile device 100 includes processor 102, which is communicatively coupled to storage device 104, system memory 120, display 130, image capture device controller 134, wireless communication radios 142a-n, and other components described herein. The components of mobile device 100 are communicatively coupled to each other by a bus or system interconnect 103. Only one of the connections of system interconnect 103 is labeled in FIG. 1. Mobile device 100 further includes storage device 104 and system memory 120. System memory 120 may be a combination of volatile and non-volatile memory, such as random access memory (RAM) and read-only memory (ROM). System memory 120 can store program code or similar instructions associated with applications 122, operating system 124, firmware 128, and communication module 136. Processor 102 loads and executes program code stored in system memory 120. Examples of program code that may be loaded and executed by processor 102 include program code associated with applications 122 and communication module 136.

Display 130 can be one of a wide variety of display screens or devices, such as an OLED display. In the illustrated embodiments, display 130 is a touch screen device that includes a tactile, touch screen interface 131 that allows a user to provide tactile/touch input to or control mobile device 100 by touching the display screen.

In one embodiment, image capture device 132 is communicatively coupled to image capture device controller 134, which is communicatively coupled to processor 102. Image capture device 132 can capture images that are within the field of view of image capture device 132. In one embodiment, image capture device 132 is a rear facing image capture device that faces the back or rear of housing 180.

Radios 142a-n are coupled to dual-purpose antenna 148a and second antennas 148b-n. Dual-purpose antenna 148a and other second antennas 148b-n and are positioned within housing 100. At least dual-purpose antenna 148a is formed from metal. Dual-purpose antenna 148a is a dual use antenna that serves as both an antenna for communication and as a capacitance sensor for sensing capacitance (referred to interchangeably as dual-purpose antenna 148a). Radios 142a-n, dual-purpose antenna 148a and second antennas 148b-n allow mobile device 100 to communicate wirelessly with external devices 152a-n via wireless network 150. In one embodiment, external devices 152a-n can be radios (i.e., wireless signal transmitters and receivers) located at various cellular communication towers.

Mobile device 100 can further include data port 133, which is connected with processor 102 and charging circuitry 135. Charging circuitry 135 enables external charging of battery 143 via power input through data port 133. Mobile device 100 further includes microphone 108, ear speaker 144A, loud speaker 144B, and one or more physical buttons 107a-n. A user holding mobile device 100 near their face can hear audio being output by ear speaker 144A. Loud speaker 144B plays sounds at a louder volume that can be heard when a user is farther away from mobile device 100. Buttons 107a-n may provide controls for volume, power, and image capture device 132.

Mobile device 100 further includes motion sensor(s) 161 that are communicatively coupled to processor 102. Motion sensor(s) 161 can detect movement of mobile device 100 and provide motion data to processor 102 that indicate the spatial orientation and movement of mobile device 100. Motion sensor(s) 161 can include one or more accelerometers 162 and gyroscope 163. Accelerometers 162 measure linear acceleration of movement of mobile device 100 along multiple axes (X, Y and Z). In one embodiment, accelerometers 162 can include three accelerometers, where one accelerometer measures linear acceleration along the X axis, one accelerometer measures linear acceleration along the Y axis, and one accelerometer measures linear acceleration along the Z axis. Gyroscope 163 measures rotation or angular rotational velocity of mobile device 100.

Mobile device 100 further includes additional components, such as global positioning system (GPS) module 164 and short-range communication component 147. GPS module 164 can receive location and time data from GPS satellites. Short range communication component 147 is a low powered transceiver that wirelessly communicates with other wireless networks, such as with wireless network 182. Short range communication component 147 can be one or more of a variety of components, such as a near field communication (NFC) device, a Bluetooth device, or a wireless fidelity (Wi-Fi) device. In some embodiments, mobile device 100 can communicate over long distances with other wireless networks, such as wireless network 150. In one embodiment, wireless network 150 includes a mobile phone base station and wireless network 182 includes a Wi-Fi access point. Mobile device 100 further includes a housing 180 that contains the components of the mobile device 100.

Mobile device 100 further includes sensor circuit 190. Sensor circuit 190 is communicatively coupled to processor 102 and to dual-purpose antenna 148a. Sensor circuit 190 enables dual-purpose antenna 148a to function as a capacitive proximity sensor in mobile device 100, as will be described below.

Figure 2:
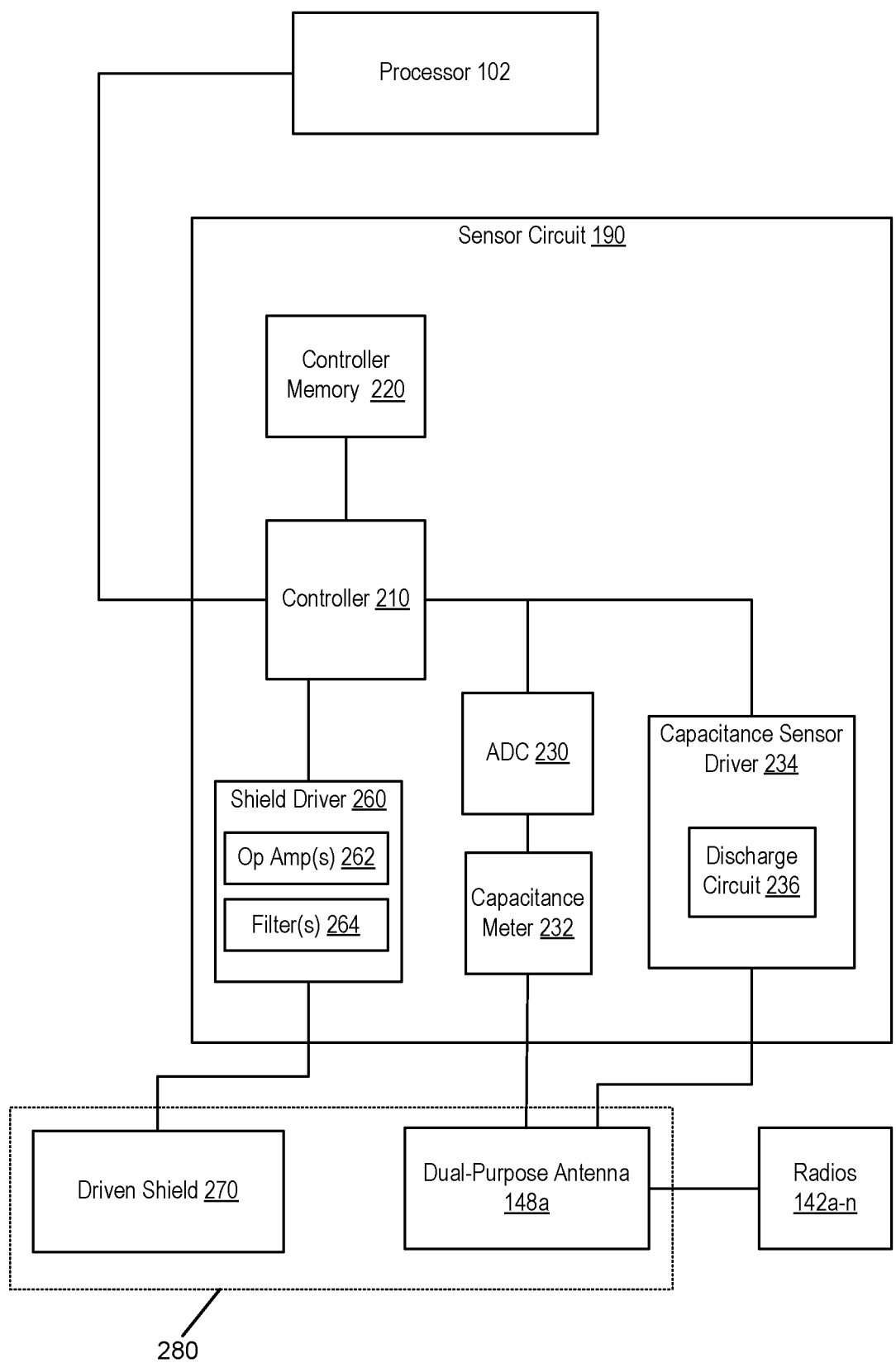
FIG. 2 is a schematic diagram of an example sensor circuit of a mobile device, according to one or more embodiments.

In the description of each of the following figures, reference is also made to specific components illustrated within the preceding figure(s). With reference now to FIG. 2, a block diagram representation of one embodiment of sensor circuit 190 is shown. In one embodiment, sensor circuit 190 can be implemented as an application specific integrated circuit (ASIC). Sensor circuit 190 includes controller 210, which is communicatively coupled to other sensor circuit components, including controller memory 220, analog to digital converter (ADC) 230, capacitance sensor driver 234. Sensor circuit 190 is also communicatively coupled to processor 102. Sensor circuit 190 further includes capacitance meter 232 and capacitance sensor driver 234. Capacitance meter 232 is electrically coupled between ADC 230 and dual-purpose antenna 148a. Capacitance sensor driver 234 is electrically coupled between controller 210 and dual-purpose antenna 148a. Capacitance sensor driver 234 includes components, such as filters, operational amplifiers and a discharge circuit 236 that enable dual-purpose antenna 148a to function as a capacitance sensor. Discharge circuit 236 discharges dual-purpose antenna 148a. Sensor circuit 190 further includes shield driver 260 that is electrically coupled to driven shield 270. Shield driver 260 includes one or more operational amplifiers 262 and filters 264. In one embodiment, shield driver 260 functions to generate an electromagnetic field.

Dual-purpose antenna 148a is further coupled to radios 142a-n. Radios 142a-n can generate radio frequency (RF) signals, on the order of giga-hertz frequencies, for dual-purpose antenna 148a to function as an antenna. Capacitance sensor driver 234 can generate sensor signals, on the order of kilo-hertz frequencies for dual-purpose antenna 148a to function as a capacitance sensor. The reference to the presented antenna component as "dual-purpose antenna" 148a means that dual-purpose antenna 148a functions as both an antenna and as a capacitive sensor. Dual-purpose antenna 148a can transmit and receive RF signals and also act as a capacitive sensor at the same time during operation with capacitance sensor driver 234. Capacitance sensor driver 234 can include driver and matching/clocking circuitry.

In one embodiment, driven shield 270 can be positioned on one side of dual-purpose antenna 148a. According to one aspect, controller 210 can activate or turn on shield driver 260. When shield driver 260 is activated, shield driver 260 provides an electrical charge to driven shield 270. In one embodiment, shield driver 260 drives driven shield 270 to the same potential (alternating current (AC) or direct current (DC)) as dual-purpose antenna 148a. Capacitance sensor driver 234 can use an AC signal to drive dual-purpose antenna 148a at frequencies that are significantly lower than the RF signals from radios 142a-n, allowing dual-purpose antenna 148a to be shared. The charging of driven shield 270 prevents dual-purpose antenna 148a from sensing capacitance from one side of mobile device 100 where driven shield 270 is located. The combination of dual-purpose antenna 148a and driven shield 270 form proximity sensor 280. According to one aspect of the disclosure, driven shield 270, when disabled, allows dual-purpose antenna 148a to function as both an antenna and as a multiple-sided capacitance sensor (sensing from front and back sides of mobile device 100). Driven shield 270, when enabled, allows dual-purpose antenna 148a to function as an antenna and a single-sided capacitance sensor (sensing from only the front side of mobile device 100). Dual-purpose antenna 148a functions as an antenna with or without driven shield 270 activated. Driven shield 270 prevents dual-purpose antenna 148a from sensing capacitance from the back side (and/or other sides, edges) of mobile device 100 when ear speaker 144A is active. Driven shield 270 is by definition a conductive shield raised to the same voltage potential as the capacitor voltage potential of dual-purpose antenna 148a. When driven shield 270 is at the same voltage potential as the voltage potential of dual-purpose antenna 148a, there is no electromagnetic field between driven shield 270 and dual-purpose antenna 148a. Dual-purpose antenna 148a is prevented from sensing a conductive body (i.e., a user) that is located behind the driven shield. Driven shield 270 does not load dual-purpose antenna 148a with capacitance. In contrast, if a ground shield were used, as a replacement for driven shield 270, dual-purpose antenna 148a would be loaded with capacitance to ground.

In one embodiment, when driven shield 270 is disabled, capacitance sensor driver 234 initiates a high impedance mode for dual-purpose antenna 148a. Capacitance sensor driver 234 can use a calibration value, representing the parasitic capacitance seen by dual-purpose antenna 148a for the high impedance mode. The calibration value will change between enabled and disabled modes of driven shield 270. Capacitance sensor driver 234 can switch calibration values between the two modes. Using a high impedance mode for dual-purpose antenna 148a epreventscharge from transferring to driven shield 270 in the case where driven shield 270 is enabled (no voltage difference) or the case where driven shield 270 is disabled (no current path).

Figure 3B:
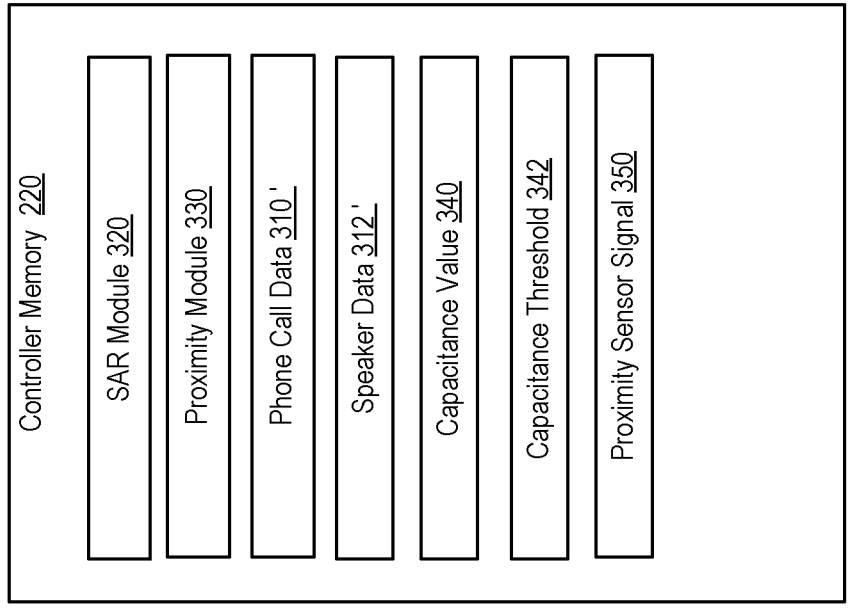
FIG. 3B is a block diagram of a controller memory of a mobile device configured with example contents to provide at least one of the novel features of the disclosure, according to one or more embodiments.
Figure 3A:
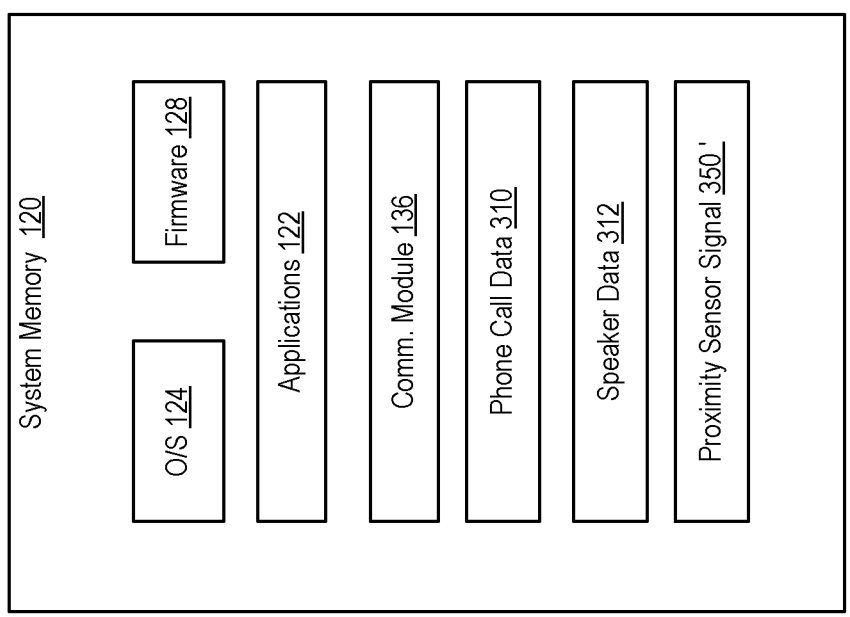
FIG. 3A is a block diagram of the system memory of a mobile device configured with example contents to provide at least one of the novel features of the disclosure, according to one or more embodiments.

With reference now to FIG. 3A, one embodiment of example contents of system memory 120 of mobile device 100 is shown. System memory 120 includes data, software, and/or firmware modules, including applications 122, operating system 124, firmware 128, communication module 136, phone call data 310, speaker data 312 and proximity sensor signal 350'. Communication module 136 enables processor 102 to facilitate communications (i.e., phone calls and data) between radios 142a-n and wireless network 150. Phone call data 310 contains information about whether mobile device 100 is in an active phone call or not in an active phone call. Speaker data 312 contains information about whether ear speaker 144A is active. Proximity sensor signal 350' is received from controller 210 and indicates that a body part of a user, typically the user's face, is in proximity to or next to display 130.

With reference now to FIG. 3B, one embodiment of example contents of controller memory 220 of sensor circuit 190 is shown. Controller memory 220 includes data, software, and/or firmware modules, including specific absorption rate (SAR) module 320 and proximity module 330. SAR module 320 enables mobile device 100 to limit the amount of radio frequency (RF) energy generated by radios 142a-n when dual-purpose antenna 148a detects the presence of a user in contact with or close to mobile device 100. SAR is a measure of the rate at which energy is absorbed per unit mass by a human body when exposed to a RF electromagnetic field. Proximity module 330 enables dual-purpose antenna 148a to function as a capacitive proximity sensor in mobile device 100 as will be described in detail below. In one embodiment, proximity module 330 enables controller 210 and sensor circuit 190 to perform the processes presented in the flowchart of FIG. 10, as will be described below.

Controller memory 220 further includes phone call data 310', speaker data 312', capacitance value 340, capacitance threshold 342 and proximity sensor signal 350. Phone call data 310' is received from processor 102 and contains information about whether mobile device 100 is in an active phone call. Speaker data 312' is received from processor 102 and contains information about whether ear speaker 144A is active. Capacitance value 340 is the value of capacitance sensed by dual-purpose antenna 148a and measured by capacitance meter 232. ADC 230 coverts the capacitance measured by capacitance meter 232 into a digital value that is stored in controller memory 220 as capacitance value 340.

Capacitance threshold 342 is a threshold value of capacitance, that when exceeded, indicates that a body part of a user is next to display 130. In response to capacitance value 340 being greater than or equal to capacitance threshold 342, controller 210 generates proximity sensor signal 350 and transmits proximity sensor signal 350 to processor 102. Proximity sensor signal 350 indicates that a body part of a user is in proximity to or next to display 130.

Figure 4A:
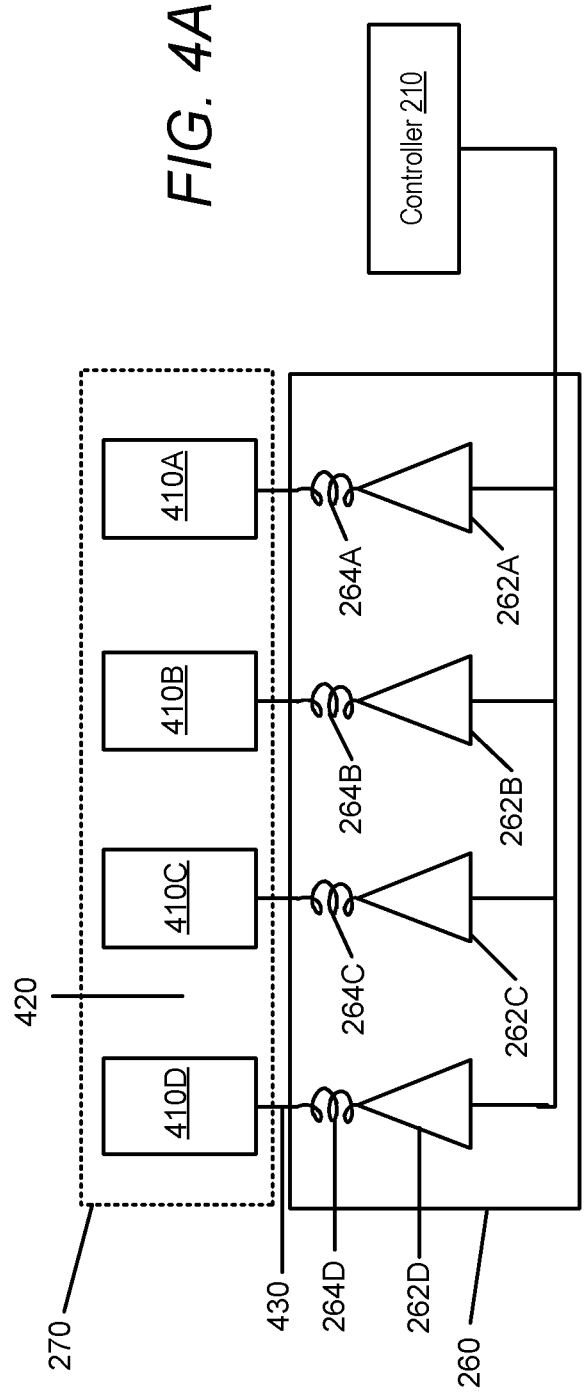
FIG. 4A is a schematic diagram of a parallel-connected shield driver circuit of a mobile device, according to one or more embodiments.

FIG. 4A illustrates components of a parallel-connected embodiment of shield driver 260 and driven shield 270. Shield driver 260 includes operational amplifiers 262A, 262B, 262C and 262D and filters 264A, 264B, 264C and 264D. In one embodiment, filters 264A-D can be inductors or RF chokes. The values of the inductors or RF chokes can be chosen to prevent interference to the RF frequency operation of dual-purpose antenna 148a when dual-purpose antenna 148a is operating as an antenna and when dual-purpose antenna 148a is operating as a capacitance sensor. Driven shield 270 includes segments 410A, 410B, 410C and 410D. Each of segments 410A-D is separated from each other segment by a gap 420. Respective wires 430 couple respective filters 264A-D to respective segments 410A-D. In one embodiment, segments 410A-D can be pieces of metal such as copper foil that are mounted on a non-conductive substrate. The segments 410A, 410B, 410C and 410D are significantly smaller (example, one-tenth of a wavelength or less) than the free space wavelength at the highest RF frequency at which dual-purpose antenna 148a is required to operate. The filters or RF chokes are of a value that presents a high impedance at this RF frequency. In this way, the impact on the RF performance of dual-purpose antenna 148a, caused by the physical presence of driven shield 270 is minimized.

Controller 210 is coupled to the input of each of operational amplifiers 262A-D. Filter 264A is coupled between the output of operational amplifier 262A and segment 410A. Filter 264B is coupled between the output of operational amplifier 262B and segment 410B. Filter 264C is coupled between the output of operational amplifier 262C and segment 410C. Filter 264D is coupled between the output of operational amplifier 262D and segment 410D. According to one aspect, controller 210 can control or turn on each of operational amplifiers 262A-D causing each of segments 410A-D to be electrically charged to a pre-determined voltage level and to function as a driven shield.

Figure 4B:
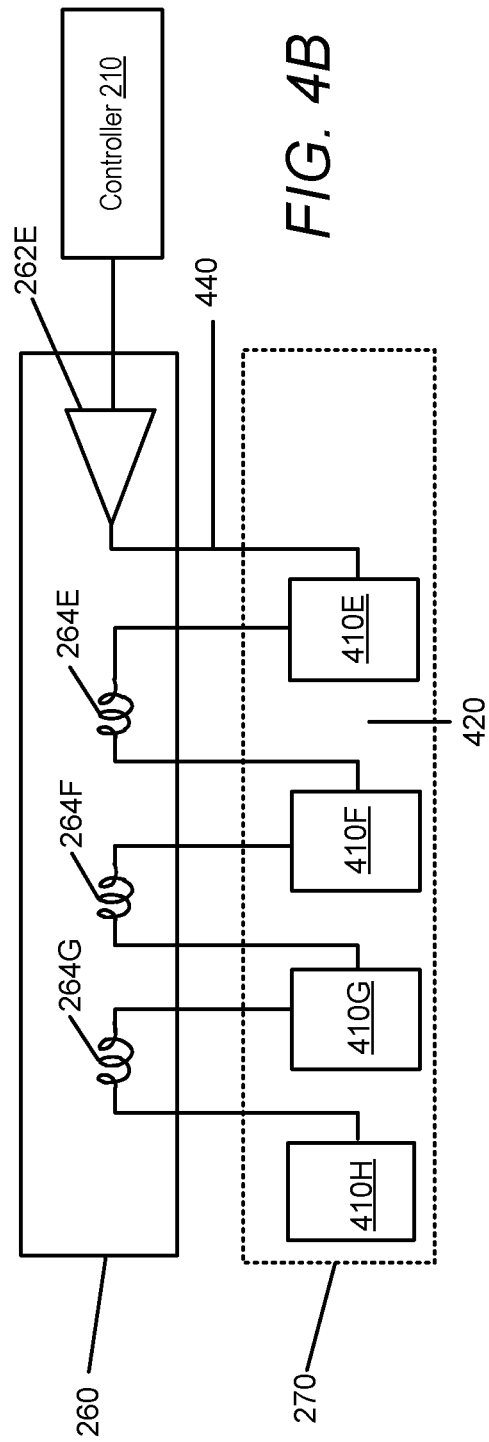
FIG. 4B is a schematic diagram of a series-connected shield driver circuit of a mobile device, according to one or more embodiments.

FIG. 4B illustrates components of a serial-connected embodiment of shield driver 260 and driven shield 270. Shield driver 260 includes operational amplifier 262E and filters 264E, 264F and 264G. In one embodiment, filters 264E-G can be inductors or RF chokes. Driven shield 270 includes segments 410E, 410F, 410G and 410H. Each of segments 410E-H is separated from each other segment by a gap 420. In one embodiment, segments 410E-H can be pieces of copper foil that are mounted on a non-conductive substrate. Respective wires 440 couple operational amplifier 262D to segment 410E and respective filters 264E-G to respective segments 410F-H.

Controller 210 is coupled to the input of operational amplifier 262E. The output of operational amplifier 262E is coupled to first segment 410E. First filter 264E is coupled between first segment 410E and second segment 410F. Second filter 264F is coupled between second segment 410F and third segment 410G. Third filter 264G is coupled between third segment 410G and fourth segment 410H. According to one aspect, controller 210 can control or turn on operational amplifier 262E causing each of segments 410E-H to be electrically charged to a pre-determined voltage level and to function as an electromagnetic shield.

Referring to FIG. 5A, a block diagram illustration of a side view of mobile device 100 is shown. Mobile device 100 includes housing 180 having a front (first) side 180A, back (second) side 180B, top side 180C and bottom side 180D. Housing 180 encloses a cavity 510. Display 130 and ear speaker 144A are mounted along and facing front side 180A. A printed circuit board (PCB) 520 is mounted in cavity 510. PCB 520 contains various electronic components of mobile device 100 such as processor 102, system memory 120, and radios 142a-n.

Dual-purpose antenna 148a is mounted adjacent to top side 180C and is coupled to at least one component on PCB 520. Driven shield 270 is mounted adjacent to one side of dual-purpose antenna 148a towards backside 180B and towards top side 180C. Shield driver 260 is coupled between at least one component on PCB 520 and driven shield 270.

Turning to FIG. 5B, a top side view of mobile device 100 is shown. Mobile device 100 further includes second antennas 148b and 148c. Second antenna 148b is mounted adjacent to first long side 180E of housing 180 and second antenna 148c is mounted adjacent to second long side 180F of housing 180. Dual-purpose antenna 148a is positioned between second antennas 148b and 148c. Driven shield 270 is mounted between one side of dual-purpose antenna 148a and back side 180B of mobile device 100.

With additional reference to FIG. 5A, according to one aspect of the disclosure, when driven shield 270 is activated, driven shield 270 shields or prevents dual-purpose antenna 148a from sensing capacitance of a second object 540 at a second side (i.e., the back side 180B) of mobile device 100 that is opposed to a first side (i.e., the front side 180A) with the ear speaker 144A. In one embodiment, second object 540 can be the hand of a user or the fingers of a user that is holding mobile device 100. When driven shield 270 is activated, dual-purpose antenna 148a still functions as an antenna.

When driven shield 270 is activated, by controller 210, driven shield 270 enables dual-purpose antenna 148a to function as both an antenna and a single-sided capacitance sensor to sense capacitance of a human object 530 at front or first side (i.e., the front side 180A) of mobile device 100 during an active phone call utilizing ear speaker 144A. In one embodiment, human object 530 can be the face of a user that is listening to a phone call using ear speaker 144A. In other words, the activation of driven shield 270 enables dual-purpose antenna 148a to function as both an antenna and a single-sided capacitance senor (i.e., proximity sensor 280) by sensing objects (i.e., human object 530) on one side (i.e., front side) of mobile device 100 and not sensing objects (i.e., second object 540) on an opposite side (i.e., back side) of mobile device 100.

When driven shield 270 is disabled or not activated, dual-purpose antenna 148a senses capacitance from both the front side 180A and the back side 180B of mobile device 100 for front and back SAR control and mitigation. Mobile device 100 uses SAR control and mitigation to limit the amount of RF energy generated by radios 142a-n when dual-purpose antenna 148a detects the presence of a user in contact with or close to mobile device 100.

Dual-purpose antenna 148a functions to sense self-capacitance. A self-capacitance sensor system measures changes in capacitance with respect to earth ground. Dual-purpose antenna 148a forms one electrode or plate of a capacitor, with the other electrode or plate being formed by the nearby user's body that is moved towards dual-purpose antenna 148a. For example, when a body part of a user moves towards dual-purpose antenna 148a, the measured capacitance increases.

In one embodiment, controller 210, executing proximity module 330, receives phone call data 310' from processor 102 and determines, based on phone call data 310', whether mobile device 100 is participating in an active phone call. In response to determining that mobile device 100 is participating in an active phone call, controller 210 determines if an ear speaker mode of mobile device 100 is enabled. In response to determining that the ear speaker mode of mobile device 100 is enabled, controller 210 activates driven shield 270 to at least partially shield dual-purpose antenna 148a from sensing capacitance of a second object 540 at a second side 180B (i.e., the back side) of mobile device 100 that is opposed to a first side 180A (i.e., the front side) with the ear speaker 144A. When activated, driven shield 270 further at least partially shields dual-purpose antenna 148a from sensing capacitance of the second object 540 at a third side 180F (i.e., an adjacent side side).

According to one aspect of the disclosure, with driven shield 270 enabled, dual-purpose antenna 148a functions as an antenna and as a single-sided capacitance sensor that is responsive to tissue approaching from front side 180A, and non-responsive to tissue approaching from back side 180B. Tissue includes human tissue, such as skin, bone, muscle, and fat. For example, if a face of user is near front side 180A, touch screen interface 131 can be disabled to prevent accidental contact. At the same time, dual-purpose antenna 148*a* would need to be made non-responsive to tissue approaching from back side 180B to prevent other body parts or tissue of a user (i.e., a hand or finger) from disabling touch screen interface 131. Driven shield 270 is mounted along back side 180B in proximity to dual-purpose antenna 148*a*. According to another aspect of the disclosure, driven shield 270 is adaptively activated only when ear speaker 144A is in active use. When ear speaker 144A is in active use, the head of a user can be expected to be in proximity to front side 180A of mobile device 100, close to display 130.

FIG. 5C illustrates a side view of a flip-type or foldable mobile device 560 in an open position. Mobile device 560 includes a housing 562 having a top half 562A and bottom half 562B. Housing 562 further includes left half front side 564A, right half front side 564B, and back side 564C. Top half 562A and bottom half 562B can pivot about hinge 566. PCB 520 is mounted in housing 562. Electronic components on PCB 520 are electrically coupled to display 130, ear speaker 144A, dual-purpose antenna 148*a* and driven shield 270 via flexible circuit 570.

FIG. 5D illustrates a side view of a flip-type or foldable mobile device 560 in a closed position. In the closed position, top half 562A and bottom half 562B are opposed to each other with opposed left half front side 564A and right half front side 564B facing each other. Dual-purpose antenna 148*a* and driven shield 270 sense when mobile device 560 is in an open or closed state. When mobile device 560 is in a closed position, dual-purpose antenna 148*a* can sense capacitance from an adjacent object (i.e., left half front side 564A). In the closed position, driven shield 270 prevents objects touching back side 564C (i.e., the hand of a user) from providing capacitance to dual-purpose antenna 148*a*. The capacitance value 340 sensed by dual-purpose antenna 148*a* can cause controller 210 (FIG. 2) to generate proximity sensor signal 350, which would indicate that mobile device 560 is in a closed position.

Figure 6A:
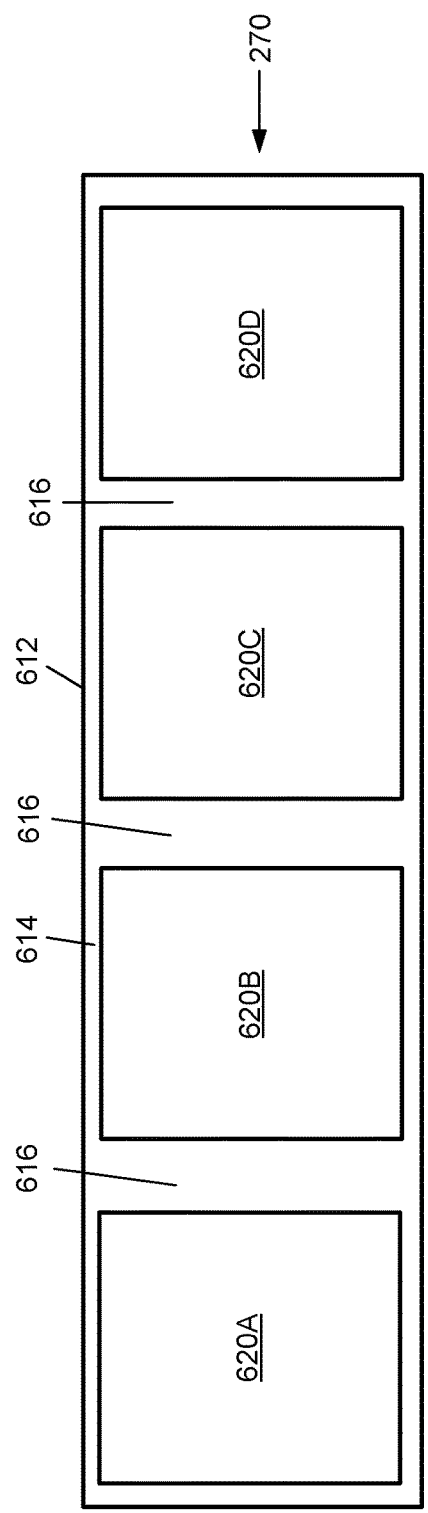
FIG. 6A is a front view of a driven shield, according to one or more embodiments.

Referring to FIG. 6A, a top down or bird's eye view of one embodiment of a driven shield 270 is shown. Driven shield 270 includes non-conductive substrate 612 (hereafter referred to as substrate 612). Substrate 612 can be formed from various materials such as plastic or polyester films. Substrate 612 has a top surface 614. Segments 620A, 620B, 620C and 620D are positioned on top surface 614. In one embodiment, segments 620A-D can be formed from copper foil and attached to top surface 614 using an adhesive. A gap 616 is located between segments 620A and 620B, between segments 620B and 620C, and between segments 620C and 620D. While four segments are shown in FIG. 6A, more or fewer segments can be used. For example, in one embodiment, the number of segments can range from 2 to 10 segments. Forming driven shield 270 into multiple segments prevents the driven shield from shorting antennas 148*a*-*n* when the antennas are operating at RF frequencies.

Figure 6B:
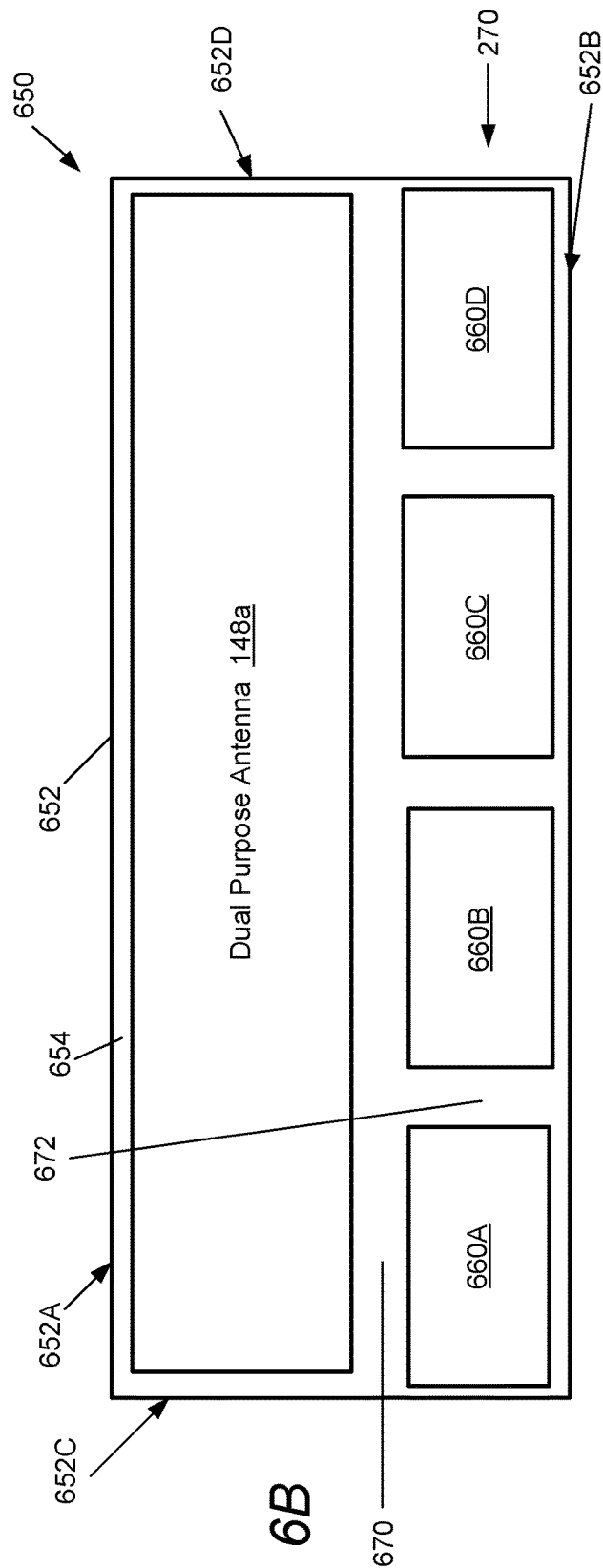
FIG. 6B is a front view of a flexible circuit including a dual-purpose antenna and driven shield, according to one or more embodiments.

With reference to FIG. 6B, a top down or bird's eye view of one embodiment of flexible circuit 650 is shown. Flexible circuit 650 comprises dual-purpose antenna 148*a* and driven shield 270. Flexible circuit 650 further includes non-conductive substrate 652 having sides 652A, 652B, 652C, 652D and top surface 654. Substrate 652 can be formed from various materials such as plastic or polyester films. Dual-purpose antenna 148*a* is located on top surface 654 towards side 652A and extends between sides 652C and 652D.

Driven shield 270 includes segments 660A, 660B, 660C, and 660D that are positioned on top surface 654 towards side 652B and extend between sides 652C and 652D. In one embodiment, dual-purpose antenna 148*a* and segments 620A-D can be formed from copper foil and attached to top surface 654 using an adhesive. Space 670 is located between dual-purpose antenna 148*a* and segments 660A-660D. Located between segments 660A and 660B, between segments 660B and 660C, and between segments 620C and 620D are respective gaps 672. While four segments are shown in FIG. 6B, more or fewer segments can be used. For example, in one embodiment, the number of segments can range from 2 to 10 segments. Forming driven shield 270 into multiple segments prevents the driven shield from shorting the antenna's RF fields when the antennas are operating at RF frequencies.

Figure 6C:
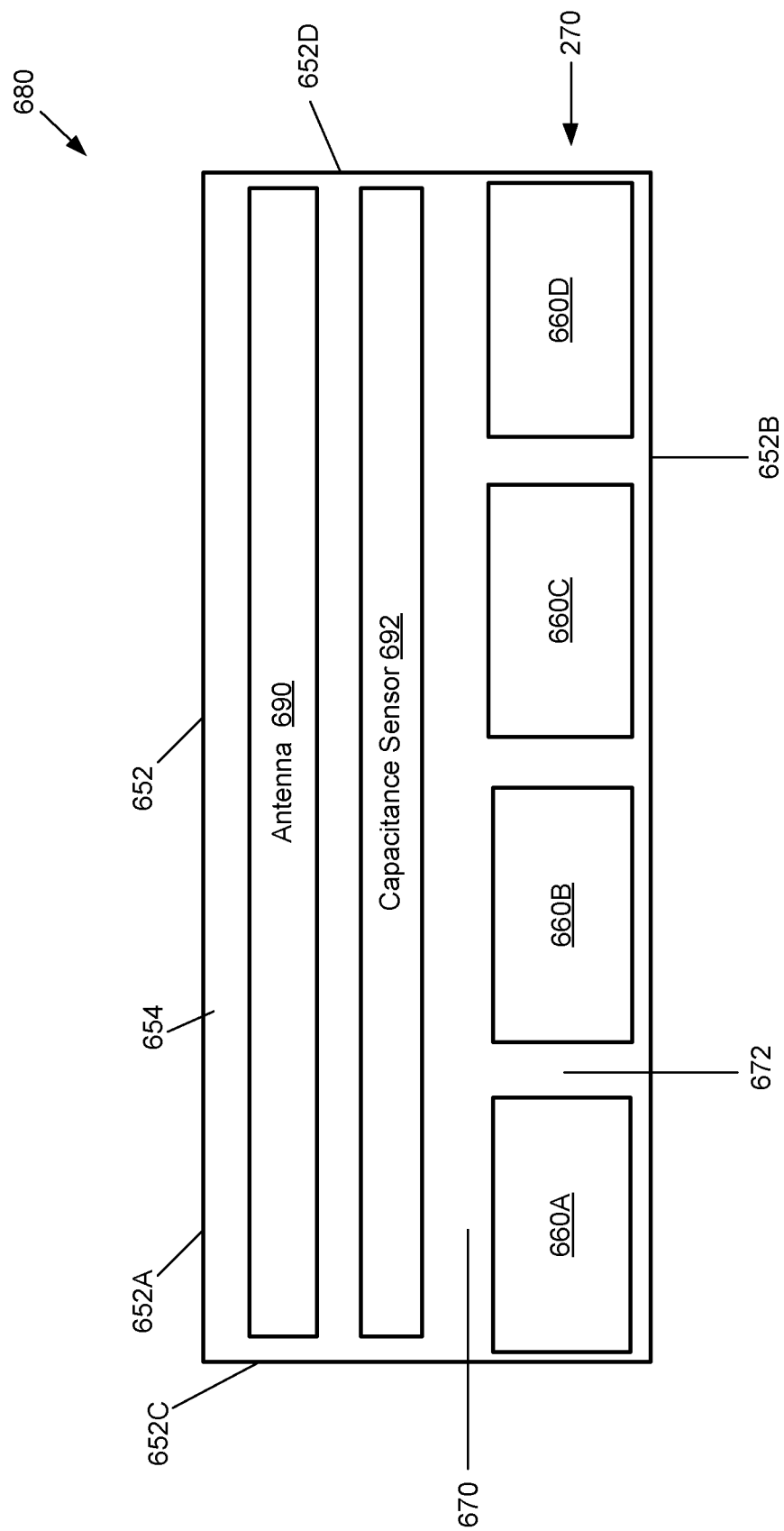
FIG. 6C is a front view of another embodiment of a flexible circuit including a separate antenna, capacitance sensor and driven shield, according to one or more embodiments.

Referring to FIG. 6C, a top down or bird's eye view of another embodiment of a flexible circuit 680 is shown. Flexible circuit 680 is similar to flexible circuit 650 of FIG. 6B except that the dual-purpose antenna of FIG. 6B has been split into two separate parts. Flexible circuit 680 includes antenna 690 and capacitance sensor 692 mounted on top surface 654 between sides 652C and 652D. Antenna 690 is located towards side 652A, and capacitance sensor 692 is located between antenna 690 and segments 660A-D. Antenna 690 functions only as the antenna, and capacitance sensor 692 functions only as a capacitance sensor.

Figure 7B:
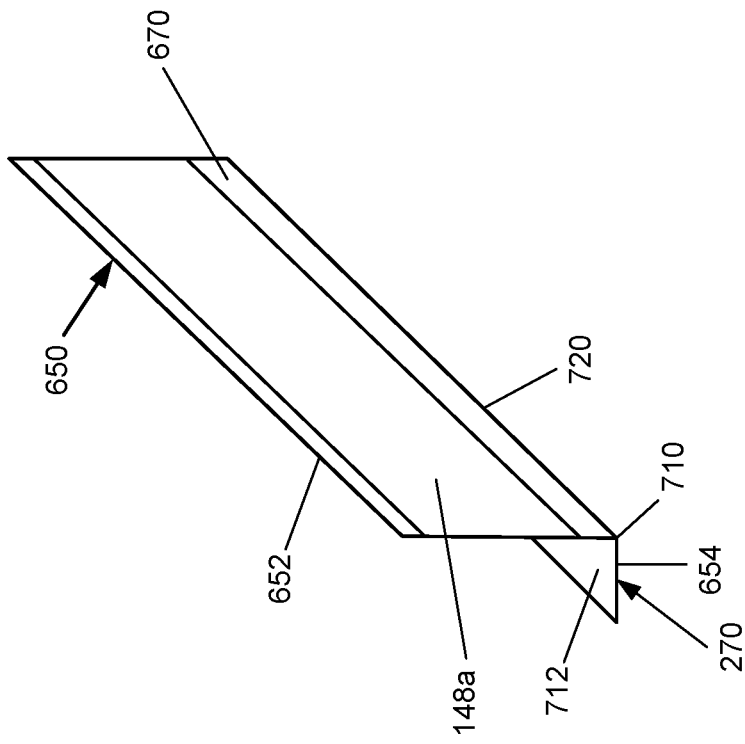
FIG. 7B is a perspective view of the flexible circuit of FIG. 6B after bending, according to one or more embodiments.
Figure 7A:
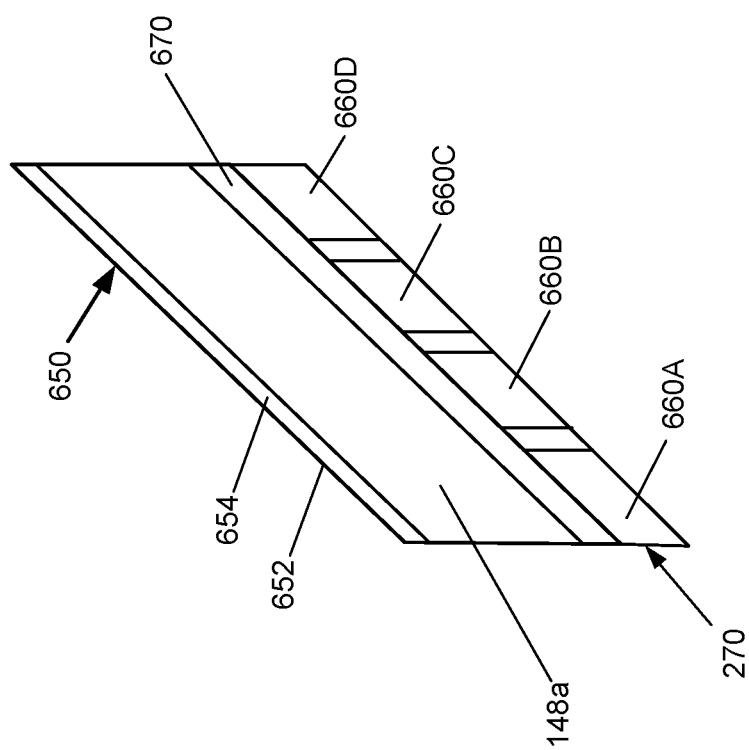
FIG. 7A is a perspective view of the flexible circuit of FIG. 6B, according to one or more embodiments.

Referring to FIG. 7A, a perspective view of flexible circuit 650 of FIG. 6B is shown before bending. Flexible circuit 650 can be folded or bent into various shapes. Turning to FIG. 7B, flexible circuit 650 can be folded or bent along space 670 to form bend 710. After bending, flexible circuit 650 has an outside corner or edge 720. After bending, driven shield 270, including segments 660A-D, faces down from front surface 654 and back surface 712 faces up in FIG. 7B. The bending of flexible circuit 650 allows for the flexible circuit to contain both antenna/capacitance sensor 148*a* and metal segments 620A-D at the spacing and orientation design specifications required within housing 180 of mobile device 100.

Figure 8A:
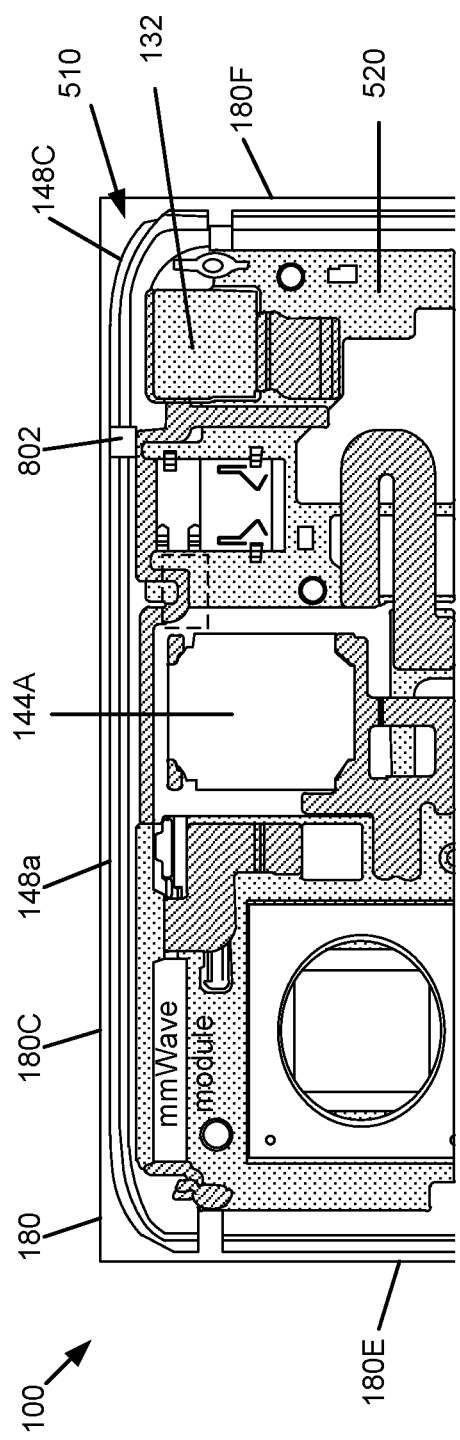
FIG. 8A is a rear cut-away view of a portion of a mobile device showing the dual-purpose antenna, according to one or more embodiments.
Figure 8B:
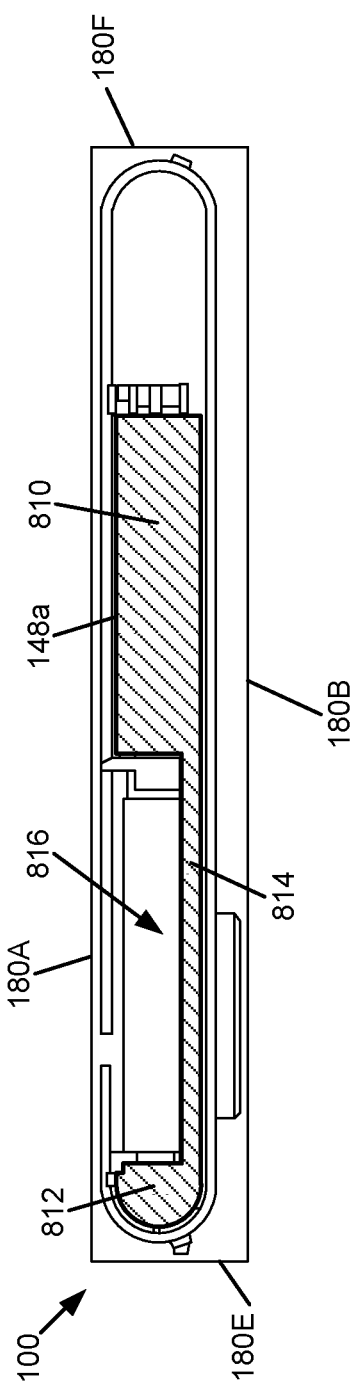
FIG. 8B is a top cut-away view of the mobile device of FIG. 8A showing the dual-purpose antenna, according to one or more embodiments.

FIG. 8A illustrates a rear cut-away view of a portion of mobile device 100 showing the location of dual-purpose antenna 148*a*. PCB 520 is mounted within cavity 510 of housing 180. Various electronic components of mobile device 100 can be mounted to PCB 520 including image capture device 132 and ear speaker 144A. Dual-purpose antenna 148*a* is mounted between PCB 520 and top side 180C. Second antenna 148*c* is mounted between PCB 520 and top side 180C towards side 180F. An insulator 802 separates dual-purpose antenna 148*a* and second antenna 148*c* Turning to FIG. 8B, a top cut-away view of mobile device 100 including further details of dual-purpose antenna 148*a* are shown. Dual-purpose antenna 148*a* has a base section 810, a head section 812 and a center section 814 that extends between base section 810 and head section 812. A recess 816 is defined in dual-purpose antenna 148*a* between base section 810 and head section 812.

Figure 9:
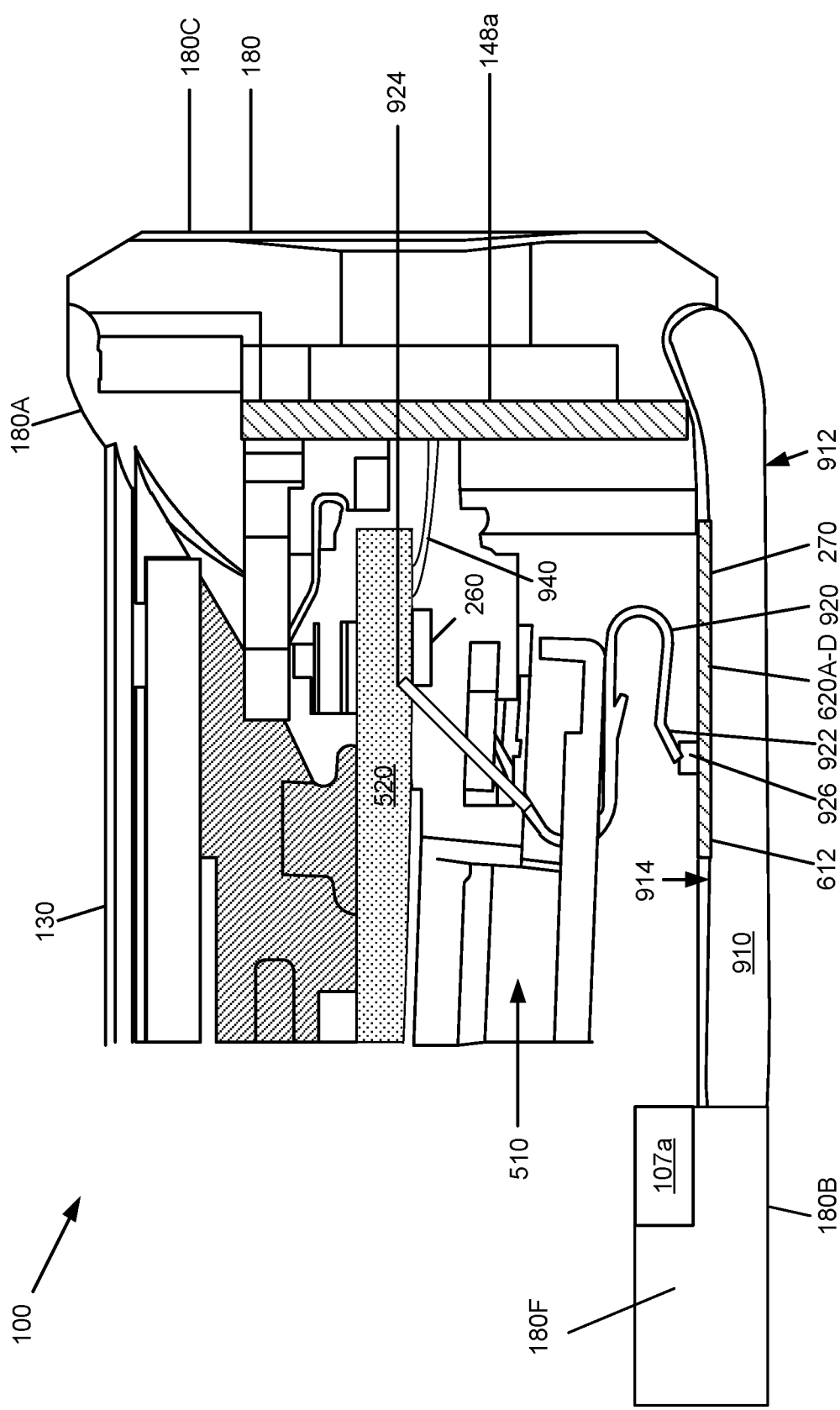
FIG. 9 is an enlarged side cross-sectional view of a top portion of a mobile device including a dual-purpose antenna and a driven shield, according to one or more embodiments.

FIG. 9 illustrates an enlarged, side cross-sectional view of a top portion of mobile device 100. Mobile device 100 includes backside glass 910 that is mounted to a portion of back side 180B. Backside glass 910 is formed from a glass material. Backside glass 910 includes an outer surface 912 and an inner surface 914. Driven shield 270 of FIG. 6A, including segments 620A-D, is mounted to inner surface 914. Driven shield 270 can be mounted to inner surface 914 using an adhesive.

PCB 520 is mounted in cavity 510 of housing 180. Shield driver 260 is mounted to PCB 520 and electrically connected to circuit lines on PCB 520. Flexible circuit 920 is located in cavity 510 and includes ends 922 and 924. Flexible circuit 920 electrically couples driven shield 270 to one or more components on PCB 520, and specifically shield driver 260. End 924 is electrically coupled to PCB 520 and to respective circuit lines on PCB 520. End 922 is electrically coupled to driven shield 270 via an electrical connection 926. Flexible circuit 920 can include individual wires that are coupled to respective segments 620A-D via electrical connection 926. In one embodiment, electrical connection 926 can be individual wires that connect to respective segments 620A-D.

Dual-purpose antenna 148a is mounted in cavity 510 towards top side 180C of mobile device 100. Dual-purpose antenna 148a is spaced slightly from one end of driven shield 270 and is oriented generally perpendicular to driven shield 270. Flexible circuit 940 electrically couples dual-purpose antenna 148a to one or more components on PCB 520. In another embodiment, the two separate pieces of driven shield 270 and dual-purpose antenna 148a in FIG. 9 can be replaced with the single flexible circuit 650 of FIG. 7B that contains both driven shield 270 and dual-purpose antenna 148a.

Button 107a is mounted to side 180F of housing 180. Driven shield 270 is positioned between dual-purpose antenna 148a and button 107a. In one embodiment, when driven shield 270 is turned on or enabled, driven shield 270 prevents dual-purpose antenna 148a from sensing capacitance when a user touches or depresses button 107a on side 180F. With driven shield 270 enabled, driven shield 270 and dual-purpose antenna 148a can sense capacitance of an object, such as tissue, only from front side 180A. The sensed capacitance can be used to disable touch screen interface 131 when a user is using an ear speaker.

Figure 10:
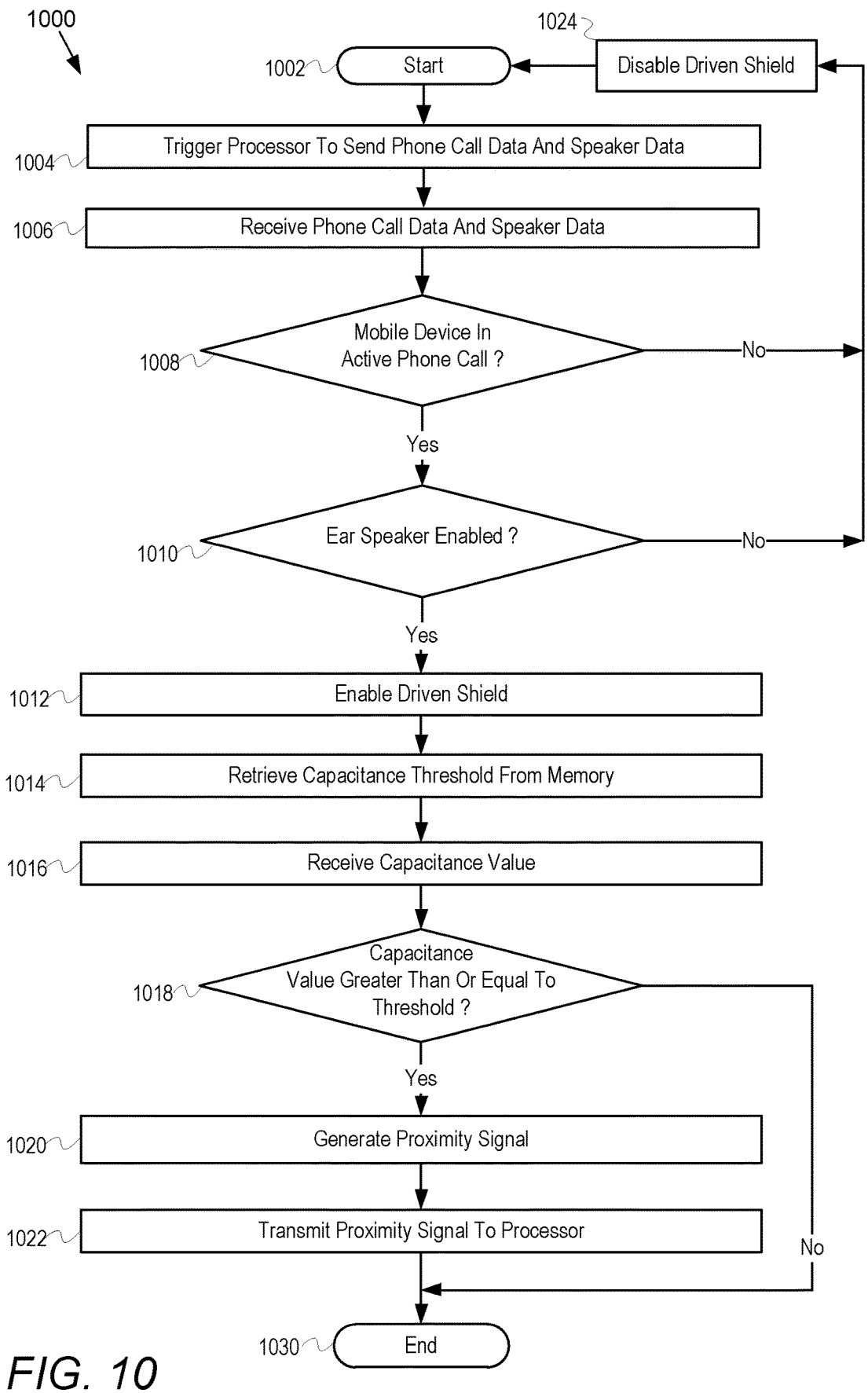
FIG. 10 depicts a flowchart of a method of using a proximity sensor in a mobile device, according to one or more embodiments.

FIG. 10 depicts a method 1000 for capacitive proximity sensing in a mobile device. The description of method 1000 will be described with reference to the components and examples of FIGS. 1-9. The operations depicted in FIG. 10 can be performed by mobile device 100 or other suitable devices. One or more of the processes of the methods described in FIG. 10 may be performed by a controller (e.g., controller 210) of mobile device 100 executing program code associated with proximity module 330.

Method 1000 begins at start block 1002. At block 1004, controller 210 triggers processor 102 to send phone call data 310 and speaker data 312 to controller 210. Controller 210 receives phone call data 310 and speaker data 312 (block 1006). Controller 210 determines, based on phone call data 310, whether mobile device 100 is participating in an active phone call (decision block 1008). In response to determining that mobile device 100 is not participating in an active phone call, controller 210 turns off or disables driven shield 270 (block 1024). Controller 210 can disable driven shield 270 via turning off or not turning on shield driver 260. After block 1024, method 1000 returns to start block 1002 to continue detecting and responding to environmental changes detected during active phone calls.

In response to determining that mobile device 100 is participating in an active phone call, controller 210 determines if an ear speaker mode of mobile device 100 is enabled (decision block 1010). The ear speaker mode is enabled when ear speaker 144A is on or active. In response to determining that the ear speaker mode of mobile device 100 is not enabled, controller 210 turns off or disables driven shield 270 (block 1024). After block 1024, method 1000 returns to start block 1002 to continue detecting and responding to environmental changes detected during active phone calls. When driven shield 270 is disabled, dual-purpose antenna 148a senses capacitance from both the front side 180A and the back side 180B of mobile device 100 for front and back SAR mitigation.

In response to determining that the ear speaker mode of mobile device 100 is enabled, controller 210 activates or enables driven shield 270 to at least partially shield dual-purpose antenna 148a from sensing object capacitance at back side 180B of mobile device 100, which is opposed to front side 180A with ear speaker 144A and from sensing object capacitance at adjacent side 180F with button 107a (block 1012). Controller 210 can enable driven shield 270 via turning on shield driver 260. The partially shielded dual-purpose antenna 148a operates both as an antenna and as a single-sided capacitance sensor during the active phone call utilizing the ear speaker 144A. The dual-purpose antenna 148a is configured to sense self-capacitance and enables sensing of a user in proximity to mobile device 100.

Controller 210 retrieves capacitance threshold 342 from controller memory 220 (block 1014). Controller 210 receives capacitance value 340 from ADC 230 (block 1016). In one embodiment, ADC 230 and capacitance meter 232 periodically sample a capacitance signal from dual-purpose antenna 148a and provide capacitance value 340 to controller 210. Controller 210 determines if capacitance value 340 is greater than or equal to capacitance threshold 342 (decision block 1018). In response to capacitance value 340 not being greater than or equal to capacitance threshold 342, method 1000 ends at end block 1030.

In response to capacitance value 340 being greater than or equal to capacitance threshold 342, controller 210 generates proximity signal 350 indicating that an object 530 (i.e., tissue that is likely from a human user) is in proximity to ear speaker 144A of mobile device 100 (block 1020). Controller 210 transmits proximity signal 350 to processor 102 (block 1022). Processor 102 can use proximity signal 350 to initiate turning off display 130 and/or touch screen interface 131 to prevent input being detected at/by touch screen interface 131 and to reduce power consumption while the user is in proximity to ear speaker 144A. Method 1000 then concludes at end block 1030.

In the above-described method of FIG. 10, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
    determining, by a controller of a mobile device, whether the mobile device is participating in an active phone call;
    in response to determining that the mobile device is participating in an active phone call, determining if an ear speaker mode of the mobile device is enabled; and
    in response to determining that the ear speaker mode of the mobile device is enabled, activating a driven shield to at least partially shield a capacitance sensor from sensing object capacitance from a side of the mobile device.

2. The method of claim 1, wherein the combination of the driven shield and the capacitance sensor operates as a proximity sensor during the active phone call utilizing the ear speaker, the capacitance sensor configured to sense self-capacitance, the capacitance sensor enabling sensing of a user in proximity to the mobile device.

3. The method of claim 1, further comprising:
    in response to determining that the ear speaker mode of the mobile device is not enabled, disabling the driven shield such that the capacitance sensor senses capacitance from both a first side and a second side of the mobile device for front and back specific absorption rate (SAR) mitigation.

4. The method of claim 1, further comprising:
    in response to determining that the mobile device is not participating in an active phone call, disabling the driven shield such that the capacitance sensor senses capacitance from both a first side and a second side of the mobile device for front and back specific absorption rate (SAR) mitigation.

5. The method of claim 1, wherein determining if an ear speaker mode of the mobile device is enabled further comprises:
    receiving a capacitance signal from the capacitance sensor;
    retrieving a capacitance threshold from a memory;
    determining if a value of the capacitance signal is greater than or equal to the capacitance threshold; and
    in response to the value of the capacitance signal being greater than or equal to the capacitance threshold:
        generating a proximity signal indicating that a user is in proximity to the ear speaker of the mobile device; and
        turning off a display including a touch screen interface of the mobile device to prevent input to the touch screen interface and reduce power consumption while the user is in proximity to the ear speaker.

6. The method of claim 1, wherein the capacitance sensor is a dual-purpose antenna that operates as a capacitance sensor and further operates as a first antenna of the mobile device during radio frequency communications.

7. The method of claim 1, wherein the driven shield comprises a plurality of segments positioned adjacent to the capacitance sensor.

8. The method of claim 7, wherein the plurality of segments are coupled in series to each other via a plurality of radio frequency chokes and a first segment of the plurality of segments is coupled to a first driver.

9. The method of claim 7, wherein each of the plurality of segments are coupled in parallel to respective radio frequency chokes and each respective radio frequency choke is coupled to a respective driver.

10. The method of claim 7, wherein the capacitance sensor and the plurality of segments are mounted to a flexible circuit and are separated by a non-conductive segment of the flexible circuit.

11. The method of claim 3, wherein the side of the mobile device is (i) opposed to a second side with the ear speaker or (ii) adjacent to a third side of the mobile device with at least one button, where at least a portion of the driven shield is positioned between the capacitance sensor and the at least one button.

12. A mobile device comprising:
an ear speaker;
a sensor circuit comprising a capacitance sensor and a driven shield; and
at least one controller communicatively coupled to the ear speaker, the capacitance sensor and the driven shield, the at least one controller enabled to:
determine whether the mobile device is participating in an active phone call;
in response to determining that the mobile device is participating in an active phone call, determine if an ear speaker mode of the mobile device is enabled; and
in response to determining that the ear speaker mode of the mobile device is enabled, activate the driven shield to at least partially shield the capacitance sensor from sensing object capacitance from a side of the mobile device.

13. The mobile device of claim 12, wherein the combination of the driven shield and the capacitance sensor operates as a proximity sensor during the active phone call utilizing the ear speaker, the capacitance sensor configured to sense self-capacitance, the capacitance sensor enabling sensing of a user in proximity to the mobile device.

14. The mobile device of claim 12, wherein the controller is further enabled to:
in response to determining that the ear speaker mode of the mobile device is not enabled, disabling the driven shield such that the capacitance sensor senses capacitance from both a first side and a second side of the mobile device for front and back specific absorption rate (SAR) mitigation.

15. The mobile device of claim 12, wherein the controller is further enabled to:
in response to determining that the mobile device is not participating in an active phone call, disabling the driven shield such that the capacitance sensor senses capacitance from both a first side and a second side of the mobile device for front and back specific absorption rate (SAR) mitigation.

16. The mobile device of claim 12, wherein the controller is further enabled to:
receive a capacitance signal from the capacitance sensor;
retrieve a capacitance threshold from a memory;
determine if a value of the capacitance signal is greater than or equal to the capacitance threshold; and
in response to the value of the capacitance signal being greater than or equal to the capacitance threshold:
generate a proximity signal indicating that a user is in proximity to the ear speaker of the mobile device; and
turn off a display including a touch screen interface of the mobile device to prevent input to the touch screen interface and reduce power consumption while the user is in proximity to the ear speaker.

17. The mobile device of claim 12, wherein the capacitance sensor is a dual-purpose antenna that operates as a capacitance sensor and further functions as a first antenna of the mobile device during radio frequency communications.

18. The mobile device of claim 12, wherein the driven shield comprises a plurality of segments positioned adjacent to the capacitance sensor.

19. The mobile device of claim 18, wherein the side of the mobile device is (i) opposed to a first side with the ear speaker or (ii) adjacent to a second side of the mobile device with at least one button, where at least a portion of the driven shield is positioned between the capacitance sensor and the at least one button.

20. A computer program product comprising:
a non-transitory computer readable storage device with program code stored thereon which, when executed by one or more controllers of a mobile device having an ear speaker, a capacitance sensor, a driven shield, a processor, and a memory, enables the mobile device to complete the functionality of:
determining whether the mobile device is participating in an active phone call;
in response to determining that the mobile device is participating in an active phone call, determining if an ear speaker mode of the mobile device is enabled; and
in response to determining that the ear speaker mode of the mobile device is enabled, activating the driven shield to at least partially shield the capacitance sensor from sensing object capacitance from a side of the mobile device.

* * * * *